(No Model.)
E. DAVIES & A. HARRISON.
PROTECTOR FOR PNEUMATIC TIRES.
No. 572,159. Patented Dec. 1, 1896.
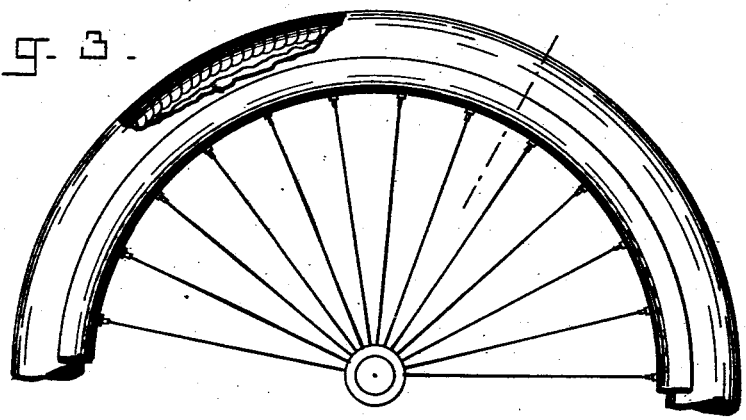
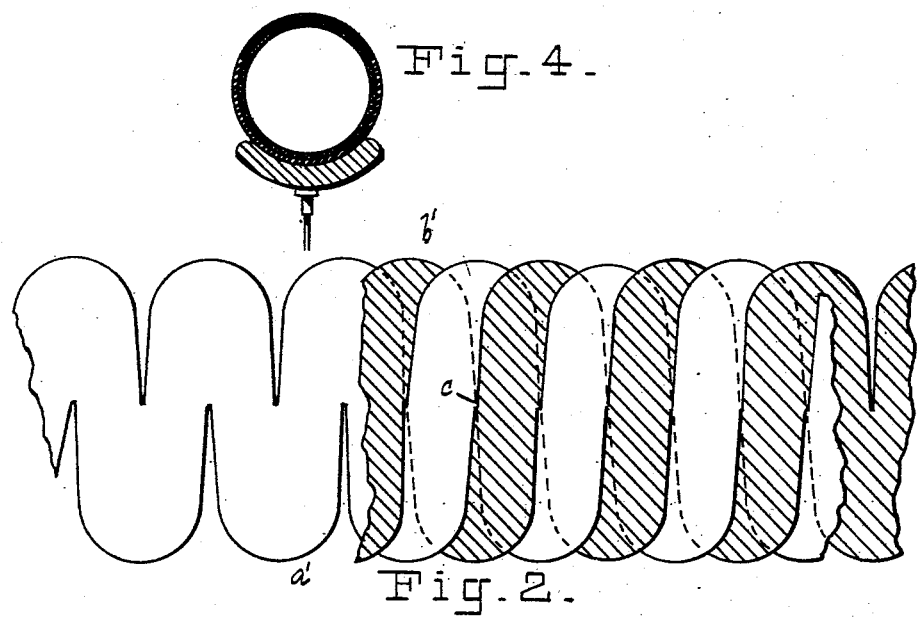
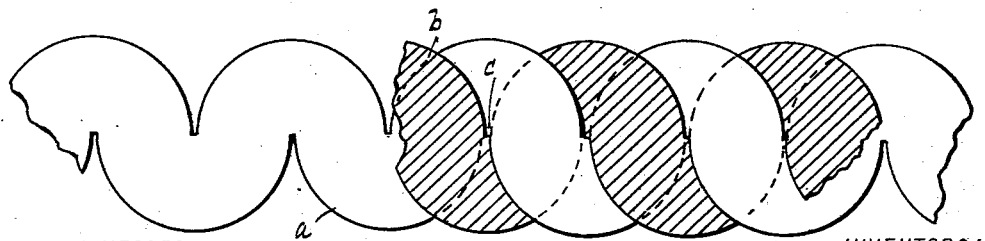
WITNESSES:
E. B. Bolton
E. A. Scott
INVENTORS:
Edward Davies
Arthur Harrison
BY Richards
ATTORNEYS

UNITED STATES PATENT OFFICE.

EDWARD DAVIES AND ARTHUR HARRISON, OF ADELAIDE, SOUTH AUSTRALIA.

PROTECTOR FOR PNEUMATIC TIRES.

SPECIFICATION forming part of Letters Patent No. 572,159, dated December 1, 1896.

Application filed July 16, 1896. Serial No. 599,414. (No model.)

*To all whom it may concern:*

Be it known that we, EDWARD DAVIES, architect, and ARTHUR HARRISON, clerk, subjects of the Queen of Great Britain, residing at 21 King William Street, Adelaide, in the Province of South Australia, have invented an Improved Protector for Pneumatic and other Similar Tires, of which the following is a full, clear, and exact description.

Our invention relates to an improved metallic protector for the purpose of rendering puncture-proof pneumatic and other similar tires. For this purpose we insert and attach in any suitable way between the rubber and the ordinary canvas tube a protector of special construction. Our improved protector is constructed of two bands of thin sheet steel, nickel, or other suitable material.

In the drawings, Figure 1 shows one form of the invention; Fig. 2, a modified form. Fig. 3 is a partial elevation of a wheel, and Fig. 4 a cross-section showing the bands in place.

The two bands are of the construction as shown in the accompanying drawings at $a$ $b$, and their serpentine folds are interwoven or interlocked, as at $c$, being passed alternately over and under one another in the manner as shown. The two loose ends are secured in a similar manner, and in this way the circle is completed and a ring or complete circlet obtained corresponding to the size of the tire to which it is to be applied.

As will be seen, the protector is composed of two interlocking members of flat material, each member being of serpentine form, thus providing a series of laterally-extending indentations, slits, or notches, and by means of these the members are interlocked, one member passing up through one notch, then down through the next notch, to lie alternately on the upper and lower sides of its companion member.

The pitch of the serpentine folds may be altered, as shown in the accompanying drawings, corresponding to the size of the wheel to which the protector is to be applied. Thus in large or carriage wheels it may be advisable to employ a protector formed of bands having a long pitch, as shown in Fig. 1, whereas in bicycles and other similar wheels it may be advisable to employ a protector formed of bands the serpentine folds of which have a shorter pitch, as shown in Fig. 2.

We wish it to be well understood that we employ any pitch as found most desirable. It will be well understood that the shorter the pitch the greater the flexibility of the protector.

The protector so constructed, and preferably after being interwoven, is passed between rolls or other suitable means by which there is imparted to it the same curve as the tire to which it is to be applied. By this means the protector, being formed of hardened steel, will assist the tire to resist the tendency to flatten under pressure, and from its construction will render the tire quicker in assuming its normal shape when such pressure is removed, while, being entirely flexible, it will in no way interfere with the elasticity of the rubber, but will assume any shape which the latter may acquire in practical working.

Having now particularly described and ascertained the nature of our said invention and in what manner the same is to be performed, we declare that what we claim is—

A protector for pneumatic and other similar tires, composed of two bands having serpentine folds of any desired pitch, interwoven or interlocked substantially as herein described.

In witness whereof we have hereunto set our hands in presence of two witnesses.

EDWARD DAVIES.
ARTHUR HARRISON.

Witnesses:
EDWIN BLACKLER COLTON,
FRANCIS H. SNOW.